March 25, 1969     G. EGGSTEIN     3,434,573

ARRANGEMENT FOR EVACUATING GASES FROM HYDRAULIC SYSTEMS

Filed Nov. 17, 1966

INVENTOR
Giorgio Eggstein
BY Michael S. Striker
ATTORNEY

United States Patent Office 3,434,573
Patented Mar. 25, 1969

3,434,573
ARRANGEMENT FOR EVACUATING GASES FROM HYDRAULIC SYSTEMS
Giorgio Eggstein, Turin, Italy, assignor to Ernst Heinkel AG, Stuttgart-Zuffenhausen, Germany
Filed Nov. 17, 1966, Ser. No. 595,087
Claims priority, application Germany, Dec. 7, 1965, H 57,896
Int. Cl. B60t *11/10;* F16k *15/00, 17/00*
U.S. Cl. 188—152      1 Claim

ABSTRACT OF THE DISCLOSURE

An arrangement for evacuating air from hydraulic braking systems in which a check valve is located between the cylinder and piston unit of the braking system and the wheel cylinder provided with a bleeding screw to permit, when the check valve is in operating position, flow of fluid only in direction from the cylinder and piston unit to the wheel cylinder so that gases contained in the hydraulic brake fluid may be evacuated from the system through the bleeding screw during pumping of fluid by operation of the unit, and in which adjustable valve actuating means cooperate with the valve body of the check valve to hold the latter away from the valve seat during normal operation of the braking system to equalize fluid pressure at both sides of the valve seat.

---

Figure 1:
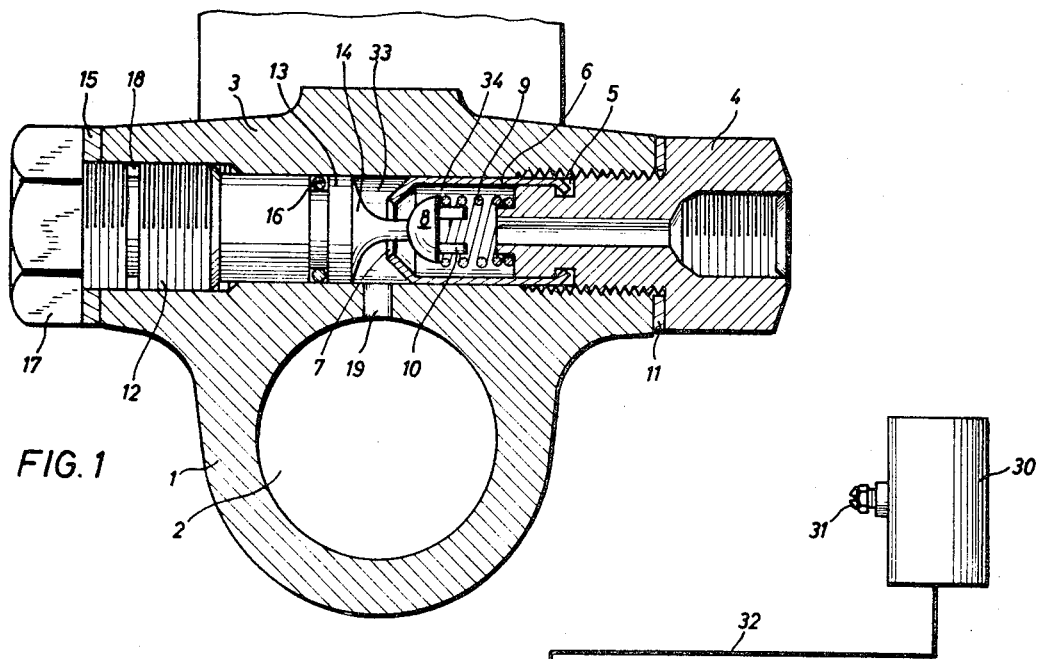

The present invention relates to improvements in arrangements for evacuating gases from hydraulic systems, particularly for bleeding air and/or other gases from hydraulic braking systems for automotive vehicles.

It is well known to provide a hydraulic braking system with an arrangement which facilitates frequent bleeding of air and/or other gases from the hydraulic circuit, i.e., from the master cylinder, from the wheel cylinders and from the conduits which connect these cylinders. As a rule, the gas evacuating arrangement comprises so-called bleeder screws on the wheel cylinders and a check valve in the connection between the master cylinder and the wheel cylinders. By moving the bleeder screws to open position and by reciprocating the master piston, the operator can expel gases from the hydraulic circuit whereby the check valve prevents return flow of brake fluid into the master cylinder. Upon completed evacuation of gases, bleeder screws are driven home and the braking system is ready for use. Failure to evacuate gases could result in serious accidents because the air bubbles act not unlike elastic cushions and prevent the application of satisfactory braking force.

A drawback of such gas evacuating arrangements is that they are not satisfactory in hydraulic braking systems wherein the pressure in the master cylinder must equal the pressure in each wheel cylinder, particularly in braking systems which utilize disk brakes. Such equalization of pressures is prevented by the check valve. Presently known attempts to retain the check valve but to allow for equalization of pressures in the cylinders when the application of brakes is completed include the provision of orifices in the valve member and/or in the seat of the check valve so that the fluid can flow back into the master cylinder when the operator ceases to apply pressure to the brake pedal. Of course, the orifices must be small to insure satisfactory application of brakes therefore, it takes a certain amount of time before the brakes are disengaged. Such delayed disengagement of brakes is highly undesirable.

Accordingly, it is an important object of my invention to provide a novel and improved arrangement for evacuating gases from the circuits of hydraulic systems, particularly from hydraulic braking systems which utilize disk brakes, and to construct the gas evacuating arrangement in such a way that its check valve cannot interfere with disengagement of brakes in immediate response to termination of pressure against the brake padel.

Another object of the invention is to provide a novel check valve which can be used in the improved gas evacuating arrangement and to provide the arrangement with novel actuating means for the check valve.

A further object of the invention is to provide a gas evacuating arrangement which can be readily installed in many presently known types of hydraulic systems and which can be installed in a hydraulic braking system without necessitating any changes in the construction and/or operation of the various cylinder and piston units.

A concomitant object of the invention is to provide a gas evacuating system which occupies little room, which can be manipulated by resorting to readily available rudimentary tools, and which can be operated by persons having little technical skill and with little loss in time.

Briefly stated, one feature of my invention resides in the provision of an arrangement for evacuating or bleeding gases from hydraulic systems, particularly for evacuating air from hydraulic braking systems. The arrangement comprises a valve housing provided with a passage through which a hydraulic fluid can flow in either direction, a cylinder and piston unit connected with the valve housing for conveying hydraulic fluid from a supply tank or another suitable source and in one direction through the passage of the valve housing, a check valve provided in the valve housing and including an apertured seat, a valve member, and resilient means for biasing the valve member into sealing engagement with the seat to thus prevent flow of fluid in the other direction, and valve actuating means operative to move the valve member away from the seat and to thus equalize the fluid pressure at both sides of the seat.

If the improved arrangement is incorporated in a hydraulic braking system, the aforementioned unit is constituted by the master cylinder and master piston of the braking system, and the passage of the valve housing is connected to one or more wheel cylinders which are provided with customary bleeder screws. When the braking system is in actual use, the actuating means maintains the valve member away from its seat. In order to evacuate air from the system, the operator will cause the actuating means to release the valve member so that the latter is automatically biased against its seat. By reciprocating the master piston, the operator will cause brake fluid to overcome the resistance of resilient means and to flow into the wheel cylinder or cylinders. The bleeder screws are moved to open position so that any gases which might be entrapped in the hydraulic system are evacuated through the outlets defined by the bleeder screws. These screws are then returned to sealing position and the actuating means is caused to move the valve member away from its seat to equalize the pressure of brake fluid at both sides of the seat.

Figure 2:
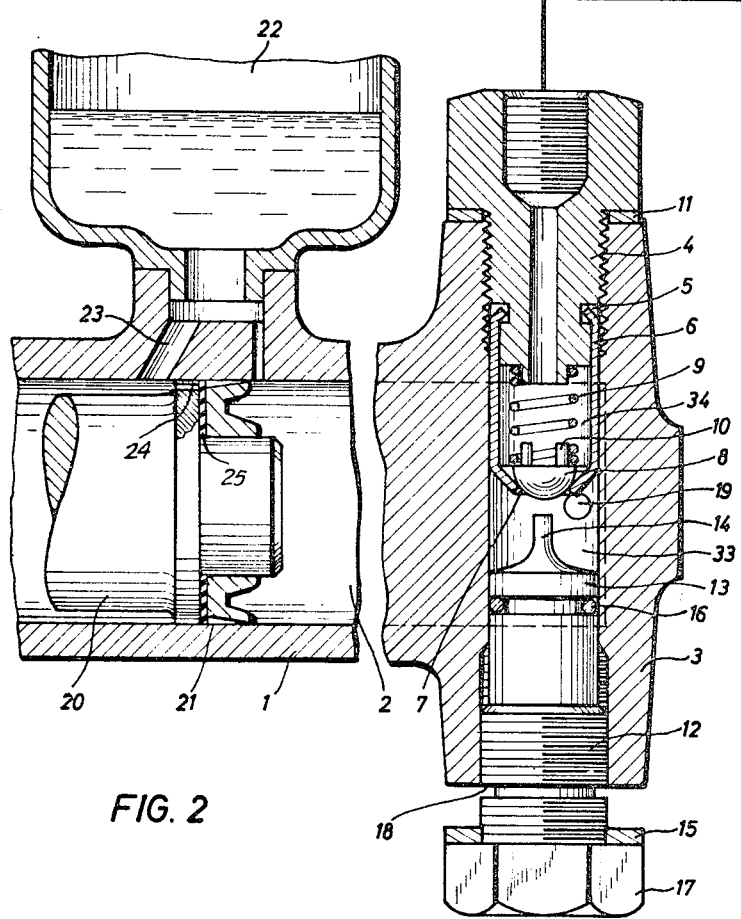

The novel features which are considered as characteristic of the invention are set forth in particular in the appended claim. The improved gas evacuating arrangement itself, however, both as to its construction and its mode of operation, together with additional features and advantages thereof, will be best understood upon perusal of the following detailed description of a specific embodiment with reference to the accompanying drawings, in which:

FIG. 1 is an axial section through the check valve of my gas evacuating arrangement, this valve being shown in open position it assumes when the hydraulic system is in actual use; and FIG. 2 is another axial section through the check valve, further showing a complete hydraulic braking system in a position it assumes when the operator is in the process of bleeding gases from the hydraulic circuit.

Referring to the drawings in detail, there is shown a hydraulic braking system for automotive vehicles which embodies the improved gas evacuating arrangement. The braking system comprises a primary cylinder and piston unit including a master hydraulic brake cylinder 1 and a master piston 20 which is reciprocable in the chamber 2 of the master cylinder and can draw brake fluid from a supply tank 22 through an intake port 23. The reference numeral 21 denotes the primary cup of the master cylinder 1. The master piston is formed in the region of its outer periphery in a known manner with at least one axial bore 24 therethrough cooperating with a flexible disc 25 between the piston and the cup 21 to act as valve permitting passage of fluid from the left to the right side of the piston, as viewed in FIG. 2, during movement of the piston to the left. The cylinder 1 is integral with a first hollow portion 3 of a valve housing which latter further comprises a second hollow portion here shown as a nipple 4 which is provided with external threads meshing with internal threads of the portion 3. A conduit 32 connects the nipple 4 with a series of wheel cylinders 30 of which only one is shown in FIG. 2. Each wheel cylinder 30 comprises a bleeder screw 31 which can be moved between a sealing and an open portion.

The composite passage 33 defined by the nipple 4 and housing portion 3 is in communication with the chamber 2 via channel 19. The nipple 4 is provided with a circumferential groove 5 which receives the inwardly bent annular flange of a sleeve-like valve seat 6 forming part of a check valve and provided with a central aperture 7 which can be sealed by a substantially semispherical valve member 8 accommodated in a compartment 34 defined by the seat 6 and nipple 4. The check valve further comprises resilient means, here shown as a prestressed helical expansion spring 9, which is interposed between the nipple 4 and the valve member 8 to bias the latter into sealing engagement with the seat 6. Thus, when the spring 9 is free to expand, the valve member 8 seals the aperture 7 and prevents flow of hydraulic brake fluid from the compartment 34 into that part of the passage 33 which communicates with the chamber 2. The valve member 8 is provided with spacer pins 10 which can abut against the adjoining end face of the nipple 4 to permit the brake fluid to flow from the bore of the nipple into the channel 19 or vice versa. The valve member 8 is held in the open position of FIG. 1 when the braking system is in actual use so that the pressure at both sides of the aperture 7 in the seat 6 is then the same. A suitable ring-shaped gasket 11 is interposed between the nipple 4 and the other housing portion 3 to prevent uncontrolled leakage of brake fluid or entry of air into the passage 33.

In accordance with a feature of my invention, the gas evacuating arrangement further comprises a shifter 12 which is an externally threaded plug and meshes with the valve housing portion 3. This shifter 12 is rotatable with reference to the valve housing and is coaxial with the check valve. Its inner end portion 13 resembles a short cylinder and comprises a motion transmitting pin 14 which can be moved axially through the aperture 7 of the valve seat 6 and into engagement with the valve member 8 to move the latter to the open or inoperative position shown in FIG. 1. The non-circular outer end portion 17 of the shifter 12 then compresses an annular sealing gasket 15 against the adjoining end face of the housing portion 3. A further gasket 16 is accommodated in a circumferential groove of the shifter 12. The end portion 17 is exposed and can be readily engaged by a suitable tool to rotate the shifter and to move the pin 14 axially between the positions shown in FIGS. 1 and 2. An index groove 18 which is machined into the periphery of the shifter 12 will be exposed when the pin 14 is moved to the retracted position of FIG. 2 in which the valve member 8 is free to seal the aperture 7. The gas evacuating arrangement is then ready for use.

The operation is as follows:

When the hydraulic braking system is in actual use, the shifter 12 is driven home and assumes the position shown in FIG. 1. The pin 14 maintains the valve member 8 in open position so that the pressure in the chamber 2 of the master cylinder 1 equals the pressure in the conduit 32. In order to apply the brakes, the operator will step on the brake pedal whereby the master piston 20 causes brake fluid to flow from the chamber 2, through the channel 19, passage 33, aperture 7, compartment 34, bore of the nipple 4, conduit 32 and into the wheel cylinder or cylinders 30. The bleeder screws 31 are held in sealing positions. When the pedal is released, brake fluid can flow back into the chamber 2 because the pins 10 and 13 maintain the valve member 8 in open position in which the check valve offers little resistance to flow of brake fluid in either direction.

In order to expel eventual air bubbles from the hydraulic circuit, the operator will move the bleeder screws 31 to open positions and the end portion 17 of the shifter 12 is rotated by a wrench or another suitable tool to retract the pin 14 to the position of FIG. 2. The operator knows that the valve member 8 has assumed its sealing position when the index groove 18 appears. By repeatedly pumping brake fluid from the supply tank through the channel 19, the operator will cause the primary cup 21 to draw such fluid via port 23 during each suction stroke and to force the fluid into the passage 33 during each working stroke of the master piston 20. This causes the fluid to open the check valve by overcoming the bias of the spring 9. Any bubbles of air or other gas which are present in the hydraulic circuit are expelled in response to a few working strokes of the master piston 20. The bleeder screws 31 are then driven home and the shifter 12 is returned to the position of FIG. 1 to maintain the valve member 8 in open position. The braking system is free of gases and is ready for renewed use because the pressure in the master cylinder 1 is the same as in each wheel cylinder 30.

A very important advantage of my gas evacuating arrangement is seen to reside in that, when the braking system is ready for use, the connection between the master cylinder 1 and each wheel cylinder 30 contains brake fluid whose pressure is identical in each zone of the hydraulic circuit. Therefore, the braking elements of the system can immediately return to retracted positions as soon as the operator ceases to depress the brake pedal, i.e., the response of each braking unit to termination of braking pressure is practically instantaneous.

Many heretofore known hydraulic braking systems are provided with bleeding orifices which are machined into the seat or valve member of the check valve and permit brake fluid to flow back into the master cylinder upon completion of the braking operation. A serious drawback of such systems is that the release of brakes is delayed because the small orifice or orifices will throttle return flow of brake fluid from the wheel cylinders. It takes quite some time before the pressure in the wheel cylinders again equals the pressure in the master cylinder, and this can lead to accidents if the driver cannot terminate the braking action at will. The aperture 7 of the valve seat 6 in my check valve is large enough to allow for substantially instantaneous equalization of pressures in each region of the hydraulic circuit as soon as the master piston 20 ceases to force brake fluid into the bore of the nipple 4.

My gas evacuating system is particularly useful in braking systems which utilize disk brakes. In such braking systems, the connection between the supply tank, master cylinder and wheel cylinders must contain brake fluid whose pressure is identical in each region of the system. The aforementioned orifices in the check valves of conventional hydraulic braking systems are unsatisfactory because they do not allow for sufficiently rapid equalization of pressures.

What is claimed as new and desired to be protected by Letters Patent is:

1. An arrangement for evacuating air from a hydraulic braking system comprising, in combination, a valve housing provided with a straight passage therethrough having opposite ends; a cylinder and piston unit communicating with the passage of said valve housing intermediate its ends for conveying hydraulic fluid into said passage; a nipple threadingly connected to said valve housing and projecting into said passage from one of the opposite ends thereof, said nipple having a through bore and being formed at its outer end with an internal screw thread; a sleeve coaxially connected to the inner end of said nipple and forming at its inner end a valve seat facing away from said opposite end of said passage; a valve member in said sleeve; resilient means between said valve member and said inner end of said nipple for biasing said valve member against said seat for preventing flow of fluid through said passage toward said cylinder and piston unit; valve actuating means extending in a sealed manner through said opposite end of said passage into the latter and being threadingly connected to said valve housing so as to be adjustable between an operative position engaging said valve member to move the latter away from said seat to thus equalize the fluid pressure at both sides of said seat, and an inoperative position disengaged from said valve member so that the latter is pressed by said resilient means against said valve seat; at least one wheel cylinder having a bleeder screw movable between an open and a closed position; and a conduit threadingly connected at one end with said internal screw thread of said nipple and connected at the other end thereof to said wheel cylinder so as to connect said passage of said valve housing downstream of said check valve with said wheel cylinder, whereby, when said valve actuating means is in said inoperative position and said bleeder screw is in said open position, reciprocating of said piston of said unit will pump hydraulic fluid past said check valve so that any air contained in the hydraulic fluid will be expelled through said open bleeder screw in said wheel cylinder.

References Cited

UNITED STATES PATENTS

| 1,001,111 | 8/1911 | Wood | 137—553 X |
| 1,055,437 | 3/1913 | Aldridge | 137—543.17 |
| 2,092,251 | 9/1937 | Heidloff. | |
| 2,771,093 | 11/1956 | Wilson | 137—543.17 X |

GEORGE E. A. HALVOSA, *Primary Examiner.*

U.S. Cl. X.R.

137—543.19